Aug. 14, 1945.   J. M. JOHNSON ET AL   2,382,321
TURNING DEVICE FOR THE WHEELS OF AN AIRCRAFT LANDING GEAR
Filed March 15, 1943
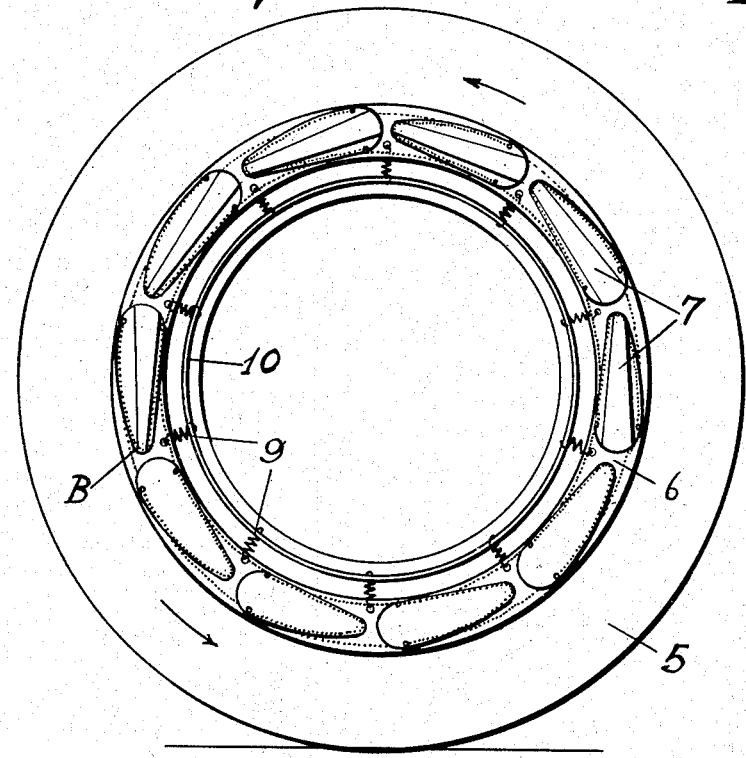
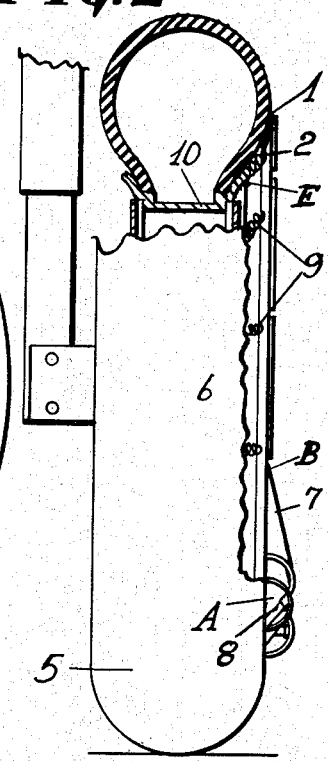
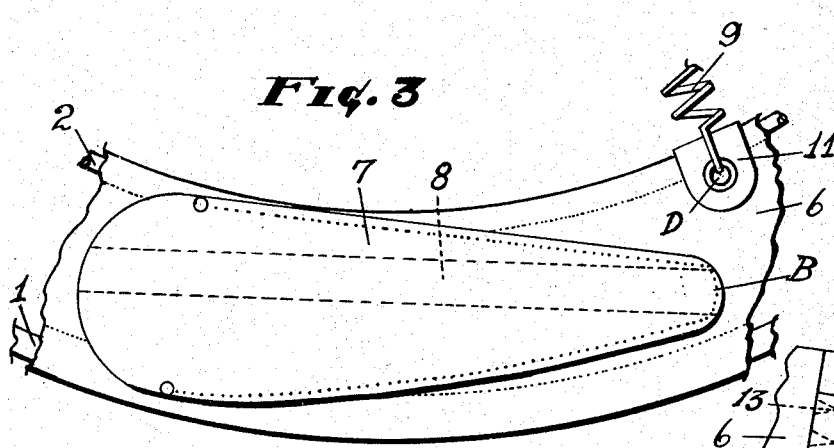
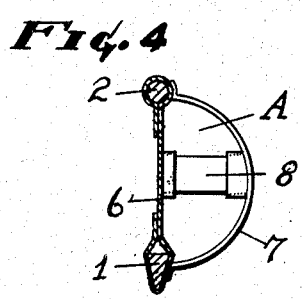
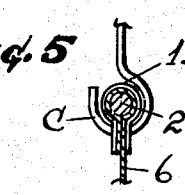
INVENTORS.
JOHN MELVIN JOHNSON
FRANK M. STRAKA
BY E. G. Charles Patented Aug. 14, 1945

2,382,321

UNITED STATES PATENT OFFICE 2,382,321

TURNING DEVICE FOR THE WHEELS OF AN AIRCRAFT LANDING GEAR

John Melvin Johnson, Lindsborg, and Frank M. Straka, McPherson, Kans.

Application March 15, 1943, Serial No. 479,238

1 Claim. (Cl. 244—103)

Our invention relates to a turning device for the wheels of an aircraft landing gear, and has for one of its objects to protect the treads of tires against mutilation by eliminating a sliding movement prior to the rotation of the tire at the time of landing the craft.

Another object is to construct a device as an accessory to be applied to the side wall of a tire as turning means for the wheel on which the tire is mounted, the wheel or wheels being turned coordinately with the aircraft direction of flight, and the turning means for the wheels being the air through which the craft is moving at a high rate of speed.

A further object of our invention is to construct the wheel turning device from flexible material such as woven textile fabric to avoid excess weight, the fabric however being supported by the metallic bands minimized with respect to cross section to avoid excess weight thereof but of sufficient strength to support the device as a whole in close contact with the wall of the tire and to exclude air from passing between the device and wall of the tire at all times, and more particularly at the time of landing the craft.

A still further object of our invention is to avoid a nose tip of the aircraft when attempting to land as the landing gear wheels are revolving freely to carry the craft in its directional movement.

A still further object of our invention is to produce a wheel turning device that is inexpensive to manufacture, easily applied to the wheel, and efficient in its function.

These and other objects will hereinafter be more fully explained, reference being had to the accompanying drawing forming a part of this specification, and wherein like characters will apply to like parts in the different views.

Referring to the drawing:

Fig. 1 is a side elevation of a tire, illustrating the position of its aerial turning means.

Fig. 2 is a transverse view of Fig. 1, partly in section.

Fig. 3 is an enlarged fragmentary side view of the turning means.

Fig. 4 is a cross section through the turning means adjacent the mouth of one of the pockets, prior to collapsation.

Fig. 5 is an enlarged sectional view through the inner annular band to illustrate the clip and spring hook.

Fig. 6 is a fragmentary view of the turning means, parts removed for convenience of illustration.

Our invention herein disclosed consists of outer and inner annular bands 1 and 2, respectively, said bands each being severed as shown in Fig. 6 and being separately connected by sleeves 3 and 4, one end of each sleeve being secured to one end of its respective band, while the other ends of said bands are adapted to slidably engage in their respective ends of the sleeves, whereby a frame is formed and separably connected at one point for the purpose later described.

It will be seen that the inner band is cylindrical in cross section, while the outer band is flattened. The sides of outer band converge outward to provide a thin outer peripheral edge therefor, the purpose of which arrangement is to avoid a current of air passing between said flattened band and the side wall of a tire 5 during flight of the aircraft prior to landing.

The said annular bands are assembled coaxial with each other and are connected by a web 6 made of textile woven fabric, canvas preferred. The peripheral inner and outer edges of the fabric are lapped around their respective bands and stitched, the fabric being stretched tightly between said bands, with the result that the bands and fabric are in the same plane prior to its installation on a tire.

As a means to rotate the structure, there is provided a plurality of fabric pockets 7, secured to the web in spaced relation therearound. The sides and smaller end of the pockets are marginally stitched to the web in such a way as to permit pouching and collapsation when in action, the pockets being adapted to flex outward when inflated by air. It will be seen that the said pockets are arranged to provide mouths A, the edge of each pocket where they meet the web converging rearward to where they connect as at B, and the mouths of the pockets extending in the same direction with respect to circumscribing the tire. Each pocket has a reinforcing rib 8, secured thereto centrally of the pocket with respect to cross section and running longitudinally of the pocket as means to avoid collapsation longitudinally and to assist in uniformity of inflation when in contact with the current of air. Said pockets, due to their construction and location on the annular structure, collapse into close engagement with the web as they are brought into their upper positions by turning of the structure. As the pockets leave their upper positions, they are again inflated and receive the impact of the air through which the craft is moving, whereby the speed ratio and turning of the wheels are equalized to avoid mutilation of the tires as they contact the landing field.

As a means to secure the wheel turning structure to the side of the tire, it will be seen that a plurality of springs 9 connect the inner band to the rim 10 of the wheel. One end of each spring is connected with the rim 10 by means of a hook which extends through an aperture E in the rim. The other end of each spring is connected by a hook c to a clip 11 on the inner band 2, the clips 11 being formed with eyes D in registery with apertures in the web 6 as shown in Figures 3 and 5. The arrangement is such that the turning device can be readily seared to the wheel in such a way that the tension of the springs will move the inner band toward the bead of the tire while the outer band will snugly engage with the wall of the tire to avoid air passing between the web and tire when the wheel is being turned at the time of landing the aircraft.

In the event of applying the turning means to the inner sides of a pair of wheels, the said device should be arranged to separate as heretofore described for the band elements, while the canvas may likewise be severed and arranged to interlap as at F as shown in Fig. 6, the lapped portion being secured by a clip 12 extending across the web and having teeth 13 extending at right angles from each edge thereof and being insertible through the web and turned toward each other as shown by dotted lines in said Fig. 6; the arrangement being such that the clip is removable to separate the web adjacent the connecting means for the said inner and outer bands, whereby the annular turning structure may be opened and closed to avoid removal of the wheel from its spindle for the installation of the said wheel turning device.

Such modifications may be made as lie within the scope of the appended claim.

Having fully described our invention what we claim as new and desire to secure by Letters Patent is:

In aerial turning devices for wheels of an aircraft landing gear, in combination with a tire and rim, inner and outer annular metallic bands, each band being severed at one point and having a telescopic coupling means therefor, flexible fabric webbing to connect said metallic bands coaxially, a plurality of elongated flexible fabric pockets stitched to said webbing in spaced relation there around and being on one side thereof, each said pockets being arched with respect to their longitudinal axis, one end of each pocket being open to receive air current to inflate the pockets as they approach the bottom of the wheels as turning means therefor, the said pockets being deflated as they reach the top of said wheels, and reinforcing ribs of rigid material secured to the pockets at their outer sides to avoid collapsation longitudinally of the pockets at the instant of their inflation, and metallic coil springs to removably attach the inner band of each device to the rim of the wheel whereby the said webbing is drawn convergently toward the turning axis of the wheel to secure the outer band to snug engagement with the side of the tire.

JOHN MELVIN JOHNSON.
FRANK M. STRAKA.